INVENTORS
M.L. JOHNSON
D.E. LUPFER
BY
Young & Quigg
ATTORNEYS

United States Patent Office 3,420,748
Patented Jan. 7, 1969

3,420,748
CONTROLLED FEEDSTOCK DIVISION TO
PARALLEL FRACTIONATORS
Merion L. Johnson and Dale E. Lupfer, Bartlesville,
Okla., assignors to Phillips Petroleum Company,
a corporation of Delaware
Filed May 25, 1967, Ser. No. 641,271
U.S. Cl. 203—1                                            9 Claims
Int. Cl. B01d 3/14; B01d 3/42

ABSTRACT OF THE DISCLOSURE

Two or more fractionators are operated in parallel with so long as the other is at or above a minimum loading. so olng as the other is at or above a minimum loading. The actual vapor flow rate in the first column is calculated and compared with a predetermined value representing maximum vapor flow rate in the first column to produce a signal representing the feed flow rate to the first column needed to achieve the maximum vapor flow rate. A limiting device limits the maximum magnitude of this signal to a value representing the maximum available feed flow rate to the first column. The latter value is determined by subtracting the predetermined minimum flow rate to the second (or additional) column from the total available feed flow rate. The output of the limiting device is applied as a set point signal to a flow controller in the feed line to the first column.

BACKGROUND OF THE INVENTION

The invention relates to the art of fluid separation by fractional distillation. In one aspect the invention relates to method and apparatus for controlling the operation of two or more fractional distillation columns in parallel. In a more specific aspect the invention is directed to a system and procedure for controlling the operation of two fractional distillation columns in parallel whereby a first column is maintained at its maximum vapor flow rate so long as the second column is maintained at or above a minimum operating level and the vapor flow rate of the first column is decreased as needed to maintain at least the minimum operating level of the second column.

In the operation of two fractionation columns in parallel, it is seldom that the two columns will be identical or even substantially similar in operating characteristics, for example, separation efficiency, utility costs, and the like. Thus it is frequently desirable to make a greater utilization of one of the columns than the other column. However, the operating characteristics of the other column, in many cases, will necessitate the operation of the other column at or above a minimum level.

In accordance with the invention the actual vapor flow rate in the first column is calculated and compared with a predetermined value representing the maximum allowable vapor flow rate which produces a signal representing the feed flow rate to the first column needed to achieve the maximum vapor flow rate. A limiting device limits the maxium magnitude of this signal to a value representing the maximum available feed flow rate to the first column. The latter value is determined by subtracting the predetermined minimum flow rate to the second (or additional) column from the total available feed flow rate. The output of the limiting device is applied as a set point signal to a flaw controller on the feed line to the first column.

Accordingly it is an object of the invention to provide new and improved method and means for controlling the operation of fractionators in parallel. It is an object of the invention to increase the degree of optimization of two or more fractionators being operated in parallel. Other objects, aspects, and advantages of the invention will be apparent from a study of the specification, drawings and appended claims to the invention.

DESCRIPTION OF THE PREFERRED EMBODIMENT

Figure 1:
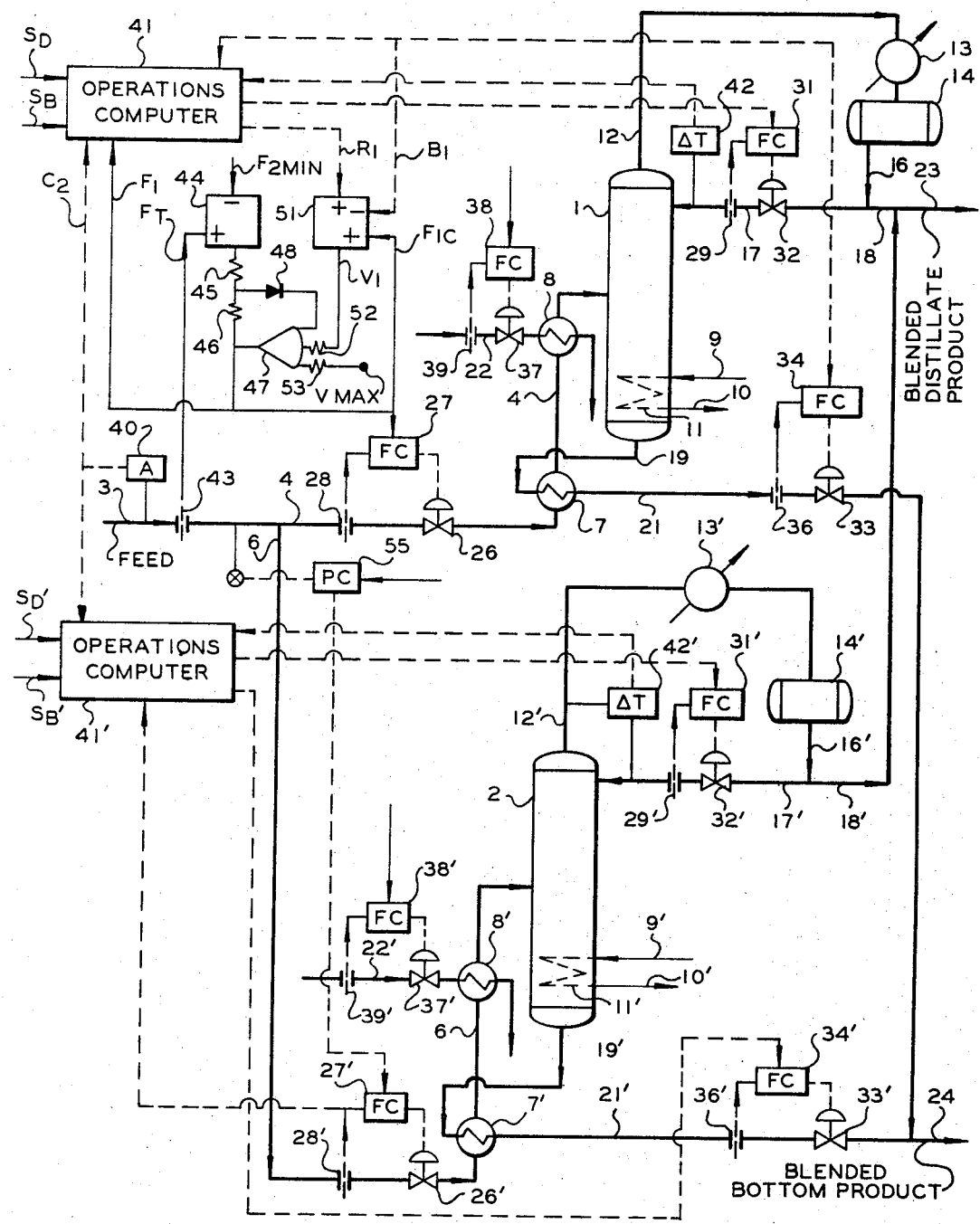
FIGURE 1 is a diagrammatic representation of a process employing two fractionators in parallel in accordance with the invention.

Referring now to the drawing, and to FIGURE 1 in particular, there are illustrated two parallel fractional distillation columns 1 and 2, each of which can be provided with a plurality of vertically spaced liquid-vapor contact trays (not shown). Feedstock, comprising a multiple component mixture, for example, liquefied petroleum gases, is obtained from a common source via conduit 3. The feedstock is split with a first portion being supplied via conduit 4 to column 1 and the second portion being supplied via conduit 6 to column 2, such feedstock portions being introduced on the feed trays in the respective column located at an intermediate level therein. As columns 1 and 2 are operated in parallel and generally have the same items of equipment, the description of the common elements will be in terms of column 1 with corresponding elements of column 2 having like reference numbers which have been primed. Where desirable a heat exchanger can be utilized to heat, vaporize or partially vaporize the feedstock to each column. In a presently preferred embodiment the first feedstock portion is passed by way of conduit 4 through an indirect heat exchanger or economizer 7 and an indirect heat exchanger or preheater 8. Heat is supplied to the kettle of column 1 by passing steam or other heat exchange medium through conduit 9 into and through reboiler coil 11, with the spent heat exchange medium being withdrawn by way of conduit 10. An overhead vaporous stream is withdrawn from an upper portion of column 1 by way of overhead conduit 12 and passed through heat exchanger 13, wherein it is cooled and condensed, with the resulting condensate being introduced into an accumulator 14. Liquid distillate is withdrawn from accumulator 14 via conduit 16. A portion of this withdrawn liquid is recycled via conduit 17 to an upper portion of column 1 as external reflux. The remainder of the liquid distillate is passed through conduit 18 into conduit 23 wherein it is blended with the liquid distillate from conduit 18′, and the blended distillate is withdrawn from the system as a distillate product. A bottoms stream is withdrawn from a lower portion of column 1 by way of conduit 19, passed through economizer 7 in indirect heat exchanging relationship with the first feed portion, and then passed by way of conduit 21 into conduit 24 wherein it is blended with a bottoms stream from conduit 21′. The blended bottoms stream is withdrawn from the system as a bottoms product. An indirect heat exchange medium, for example, steam, is supplied by way of conduit 22 to preheater 8.

The flow rate of the first feedstock portion through conduit 4 is controlled by valve 26 which is manipulated by flow recorder controller 27 responsive to a comparison of the desired flow rate represented by the set point to flow controller 27 with the value of actual flow rate obtained from flow measuring and transmitting element 28 located in conduit 4. A signal representative of the actual flow rate of external reflux through conduit 17 is obtained from flow measuring and transmitting element 29, located in conduit 17, and applied to the measurement signal input of flow controller 31 wherein it is compared against the desired value of external reflux represented by the set point of controller 31. The output of controller 31 manipulates valve 32, located in conduit 17, to control the external reflux flow rate substantially at the desired value therefor. The flow rate of the bottoms stream through conduit 21 is controlled by valve 33 which is manipulated by flow recorder controller 34 responsive to a comparison of the set point to controller 34 with the actual flow rate measurement obtained from the flow measuring and transmitting element 36, located in conduit 21. The flow rate of steam or other heat exchange medium through conduit 22 is controlled by valve 37 which is manipulated by flow recorder controller 38 responsive to a comparison of the set point to controller 38 and the actual flow rate obtained from the flow measuring and transmitting element 39. Various other controls can be utilized on each fractionator system. For example, the flow of steam through conduit 9 can be controlled by a flow controller, the set point of which is adjusted by a liquid level controller operatively connected to the kettle of column 1. The flow rate of distillate through conduit 18 can be regulated by a flow controller, the set point of which is manipulated by a liquid level controller on accumulator 14.

A sample of the feedstock is withdrawn from conduit 3 and analyzed in analyzer 40. The output of analyzer 40, representing the composition of the feedstock, the concentration of one or more selected components or the ratio of two or more selected components, is applied to an input of operations computers 41 and 41'. Signals $S_D$ and $S_B$, representing the desired specifications for the distillate stream and bottoms stream from column 1 respectively, are applied as inputs to computer 41. Similarly, signals $S_{D'}$ and $S_{B'}$, representing the desired specifications for the distillate stream and bottoms stream from column 2, respectively, are applied as inputs to computer 41. A signal, $F_1$, representative of the desired flow rate of the first feedstock portion, obtained as hereinafter described, is applied to an input of computer 41. The second feedstock portion flow rate signal, $F_2$, obtained from flow measuring and transmitting element 28' is applied to an input of computer 41'. A signal representative of the differential temperature between the vapor in conduit 12 upstream of condenser 13 and the liquid in conduit 17 is applied by differential temperature transmitter 42 to an input of computer 41. A similar signal is applied to computer 41' by differential temperature transmitter 42'. Computer 41 determines the desired internal reflux $R_{I_1}$ in column 1, the external reflux $R_{E_1}$ required to achieve the desired internal reflux, and the predicted bottoms stream flow rate $B_1$. The external reflux signal is applied to the set point of flow controller 31 while the predicted bottoms stream flow rate signal is applied to the set point of flow controller 34. The details of a suitable internal reflux computer are disclosed in L. W. Morgan U.S. 3,018,229, while the details of a suitable bottoms flow computer are set forth in D. E. Lupfer, U.S. 3,224,947. The details of a presently preferred operations computer incorporating both external reflux and bottoms flow are set forth in D. E. Lupfer, U.S. Patent 3,296,097. The descriptions of the foregoing patents are incorporated herein by reference.

The physical characteristics of columns 1 and 2 are such that it is desirable to operate column 1 at its maximum loading, as determined by the vapor flow rate at a point within the column, so long as column 2 is receiving at least a minimum feedstock input. The vapor flow rate, $V_1$, at the point of interest in the column can be defined on material balance basis as $$V_1 = R_{I_1} + D_1$$

where $R_{I_1}$ is the internal reflux and $D_1$ is the distillate removed through conduit 18. As the distillate product is the difference between the feed and the bottoms product, the vapor flow rate can be defined as $$V_1 = R_{I_1} + F_1 - B_1$$

where $F_1$ is the flow rate of feedstock through conduit 4 and $B_1$ is the flow rate of the bottoms stream through conduit 21. The values of $F_1$ and $B_1$ can be the actual measured values or the predicted values applied as set points to flow controllers 27 and 34, respectively.

A signal $F_T$, representative of the total flow rate of feedstock through conduit 3 is obtained from flow measuring and transmitting element 43 and is applied to the minuend input of subtractor 44. A signal $F_{2\ MIN}$, representative of the minimum desirable flow rate of feedstock to column 2, is applied to the subtrahend input of subtractor 44 to produce an output signal representative of the maximum available feedstock for column 1. This output signal is applied through resistors 45 and 46 to the output terminal of high gain operational amplifier 47. The junction between resistors 45 and 46 is connected through diode 48 to one input of amplifier 47. In the presently preferred embodiment illustrated in FIGURE 1, resistors 45 and 46 have equal resistance values, and the output of subtractor 44 is negative while the output of amplifier 47 is positive. A signal representing the computed internal reflux for column 1, $R_{I_1}$, is applied to one positive input terminal of algebraic adder 51. A signal representative of the predicted bottoms stream flow rate from column 1, $B_1$, is applied to a negative input terminal of adder 51, while a signal representative of the computed desired feedstock flow rate to column 1 is applied from the output terminal of amplifier 47 to a positive input of adder 51. The output signal of adder 51, representative of the computed vapor flow rate at a first point in the top section of column 1, $V_1$, is applied through resistor 52 to a second input of amplifier 47. A signal, $V_{MAX}$, representative of the maximum vapor flow at the first point in the top section of column 1 under full load conditions, is applied through resistor 53 to a third input of amplifier 47. While resistors 52 and 53 are illustrated as connected to individual inputs of amplifier 47, it is recognized that the combination of resistors 52 and 53 represents an algebraic adding network (a subtractor in view of the relationship of the two signals) and the resulting effective input signal is representative of the difference between the two signals and thus is proportional to the flow rate of the first feedstock portion required to achieve the maximum desirable vapor flow rate. Amplifier 47 produces an output signal proportional to the difference between the computed vapor flow $V_1$, and the predetermined maximum vapor flow, $V_{MAX}$, which is representative of the feed flow rate to column 1 needed to obtain the predetermined maximum vapor flow rate, so long as this output does not exceed the signal representing the maximum available feed to column 1. In the event that column 1 can process more feed than is available, the negative output of subtractor 44 is less than the positive output of amplifier 47 causing the junction of resistors 45 and 46 to go positive. Diode 48 conducts, clamping the output of amplifier 47 at the value represented by the magnitude of the output of subtractor 44. The output of amplifier 47 is connected to the set point of flow controller 27 to regulate the flow rate of the first feedstock portion through conduit 4 at the value represented by the output of subtractor 44. In the event that more feedstock is available than column 1 can process, the magnitude of the negative output of subtractor 44 will be greater than the magnitude of the positive output of amplifier 47 causing the junction of resistors 45 and 46 to go negative. Diode 48 is thus rendered nonconducting and the output of amplifier 47 is proportional to $V_{MAX} - V_1$. With high gain amplifier 47 having a very high gain, for example on the order of one million, and with the output of amplifier 47 being fed back through algebraic adder 51 to input signal $V_1$, the value of $V_{MAX} - V_1$ is driven toward zero to the extent that $V_{MAX} = V_1$ as far as the physical operation of column 1 is concerned, but retains sufficient magnitude to provide, upon being amplified one million times, the output signal representing the desired feed flow rate to column 1. The application of the output of amplifier 47, representing the desired feed flow rate to column 1, as an input signal to operations computer 41 for use in computing $B_1$ and $R_{I_1}$, causes computer 41 to serve as an instantaneous feedback circuit for updating the calculated value of the actual vapor flow rate. The output of amplifier 47 is connected to the set point input of flow controller 27 to increase the flow rate of the first feedstock portion through conduit 4 to column 1 until the resulting $V_1$ substantially equals $V_{MAX}$. The control system thus operates column 1 at its maximum vapor loading so long as the feedstock flow rate to column 2 exceeds a predetermined minimum, and operates column 1 at the maximum available loading if the feedstock flow rate to column 2 is at the predetermined minimum.

A signal representative of the pressure in conduit 3 is applied to the measurement input of pressure recorder controller 55 wherein it is compared against the set point representing the desired pressure. The output of controller 55 is applied to the set point input of flow controller 27' to manipulate the flow rate of the second feedstock portion to column 2 to maintain the pressure in conduit 3 substantially equal to the desired value of pressure. Thus when valve 26 partially closes to reduce the feedstock flow rate to column 1, the pressure in conduit 3 tends to increase, resulting in flow controller 27' opening valve 26' to increase the feedstock flow rate to column 2. Similarly an opening movement of valve 26 results in a corresponding closing movement of valve 26'.

Figure 2:
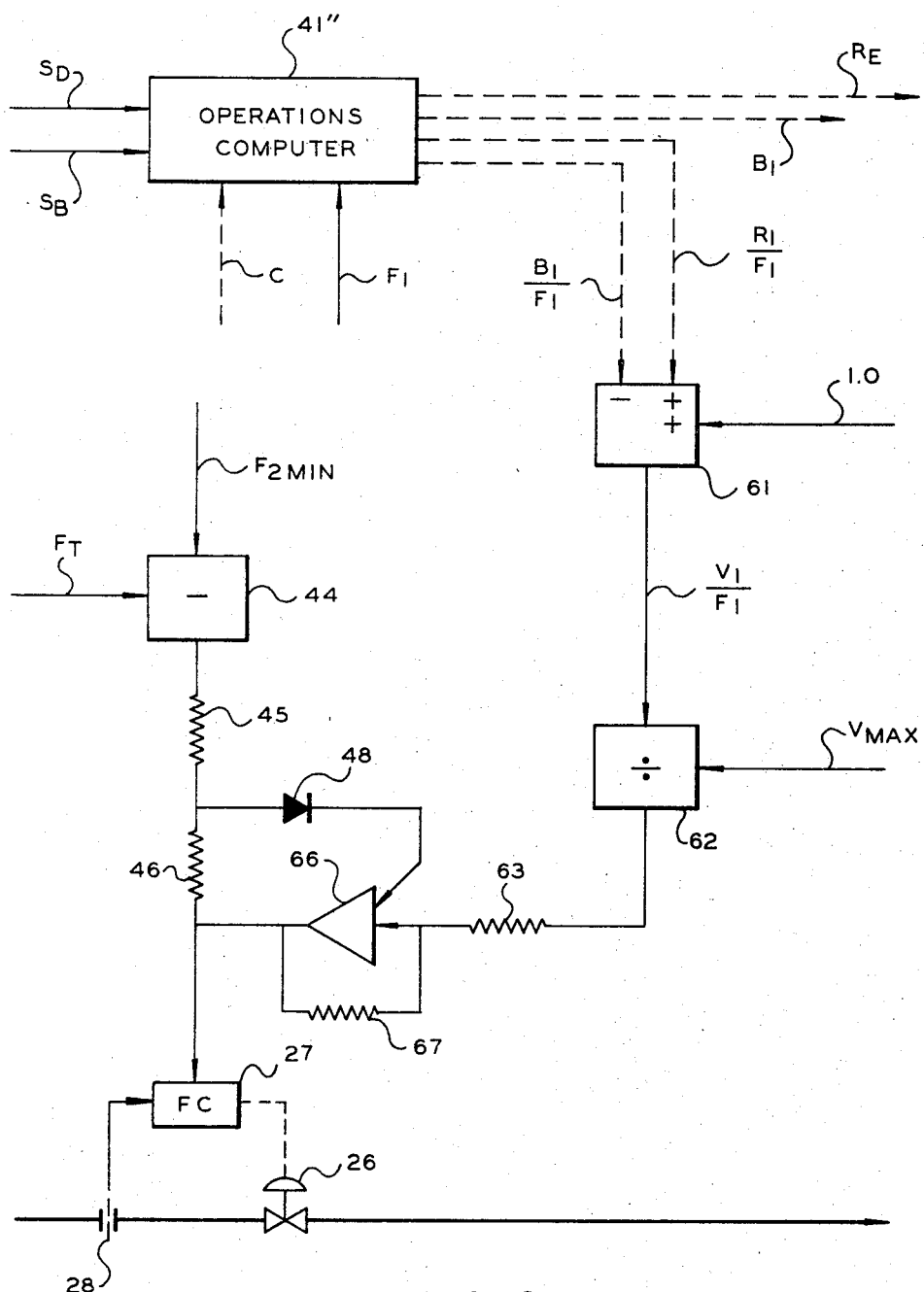
FIGURE 2 is a diagrammatic representation of a modification to the control system of FIGURE 1.

Referring now to FIGURE 2, operations computer 41'' differs from computer 41 in that outputs are provided which are ratioed to the feed flow rate to column 1. The signals $B_1/F_1$ and $R_{I_1}/F_1$ and a constant signal representing unity are applied to inputs of algebraic adder 61 to obtain a signal representative of $1+R_{I_1}/F_1-B_1/F_1=V_1/F_1$. The output signal from adder 61 is applied to divider 62 wherein it is divided into a signal representative of $V_{MAX}$. The output of divider 62 is applied through resistor 63 to an input of amplifier 66. The network comprising resistors 45 and 46 and diode 48 again comprises a limiting network to provide that the maximum output of amplifier 66 does not exceed the output of subtractor 44. A feedback path comprising resistor 67 holds the gain of amplifier 66 to a low value, for example, unity. The operation of the remainder of the system can be the same as the system of FIGURE 1. The system of computer 41'', divider 62 and unity gain amplifier 66 performs in an equivalent manner to the high gain amplifier circuit of the system of FIGURE 1. In FIGURE 1, the effect of operations computer 41 in a feedback circuit of high gain amplifier 47 is to provide a signal representative of the ratio of $V_1$ to $F_1$ which is effectively divided into $V_{MAX}$ to give the value of $F_1$ which is required to achieve the $V_{MAX}$.

SPECIFIC EXAMPLE

The following example is presented in further illustration of the invention and should not be construed to unduly limit the invention.

A system for the separation of isobutane from a feed stream comprising isobutane, n-butane, and isopentane and diagrammatically illustrated by FIGURE 1 of the drawing, is operated under the following conditions and flow rates:

| Conduit | Temperature, °F. | Pressure, p.s.i.g. | Flow rate, bbls. (liquid) per hour |
|---|---|---|---|
| 3 | 90 | 150 | 1,000 |
| 4 | 90 | 150 | 700 |
| 6 | 90 | 150 | 300 |
| 12 | 150 | 140 | 3,080 |
| 17 | 120 | 150 | 2,800 |
| 18 | 120 | 100 | 280 |
| 19 | 175 | 150 | 420 |
| 12' | 150 | 140 | 1,320 |
| 17' | 120 | 150 | 1,200 |
| 18' | 120 | 100 | 120 |
| 23 | 120 | 100 | 400 |
| 19' | 175 | 150 | 180 |
| 24 | 120 | 100 | 600 |

The characteristics of columns 1 and 2 are such that it is desirable to maintain column 1 at its maximum vapor load at a point in the top section of the column of 3,500 bbls. (liq.)/hour, while the feed flow rate to column 2 should be at least 200 bbls. per hour. Under the foregoing conditions

|   | bbls./hr. |
|---|---|
| $R_{I_1}$ | 3220 |
| $B_1$ | 420 |
| $F_1$ | 700 |
| $V_1$ | 3500 |
| $V_{MAX}$ | 3500 |
| $(F_T-F_{2\,MIN})$ | 800 |

Upon a decrease in total feedstock flow rate through conduit 3 from 1,000 to 800 per hour $(F_T-F_{2\,MIN})$ drops to 600, which is below the value of 700 for the $F_1$ corresponding to $V_{MAX}$. The limiting network clamps amplifier 47 to an output signal proportional to the available feedstock flow rate for column 1, which is 600 barrels per hour.

Reasonable variations and modifications are possible within the scope of the foregoing disclosure, the drawing and the appended claims to the invention. While resistors 45 and 46 have been described as being of equal values, they can have any desired ratio as dictated by scaling. Where the polarity of the outputs of subtractor 44 and amplifier 47 are reversed, diode 48 can be connected in reverse polarity to that illustrated. As is well known in the art, suitable time delays and time lag functions can be employed to provide a control based on dynamic conditions rather than steady state conditions. While the invention has been described in terms of electronic equipment, it is within the contemplation of the invention to utilize pneumatic components and/or mechanical components in partial or full substitution for the electrical components. $V_{MAX}$ can be the actual maximum loading of the column 1 or a maximum desirable loading. The material balance for determining vapor flow can be made at any point below the top of the column and the computation of internal reflux adjusted accordingly. While the limiting device has been illustrated as an electronic network including a diode feedback on an amplifier, any other suitable limiting devices can be utilized, for example a low pass relay which would have an output equal to the lower of two inputs.

What is claimed is:

1. A process for separating a multicomponent feedstock in at least a first fractional distillation zone and a second fractional distillation zone operated in parallel, which comprises, dividing said multicomponent feedstock into a first feedstock portion and a second feedstock portion, passing said first feedstock portion into said first fractional distillation zone as the source of feed therefor, passing said second feedstock portion into said second fractional distillation zone as the source of feed therefor, withdrawing a first vaporous overhead stream from said first fractional distillation zone, condensing at least a portion of said first vaporous overhead stream to produce a first liquefied distillate, passing at least a portion of said first liquefied distillate into an upper portion of said first fractional distillation zone as reflux therefor, withdrawing a second vaporous overhead stream from said second fractional distillation zone, condensing at least a portion of said second vaporous overhead stream to produce a second liquefied distillate, passing at least a portion of said second liquefied distillate into an upper portion of said second fractional distillation zone as reflux therefor, withdrawing a first bottoms product stream from a lower portion of said first fractional distillation zone, and withdrawing a second bottoms product stream from a lower portion of said second fractional distillation zone; wherein the improvement comprises establishing a first signal representative of the total flow rate of said multicomponent feedstock, establishing a second signal representative of the minimum desirable flow rate of said second feedstock portion to said second fractional distillation zone, establishing responsive to the difference between said first and second signals a third signal representative of the maximum available flow rate for said first feedstock portion to said first fractional distillation zone, establishing a fourth signal representative of the actual vapor flow rate at a first point in said first fractional distillation zone, establishing a fifth signal representative of the maximum desirable vapor flow at said first point in said first fractional distillation zone, establishing responsive to said third, fourth and fifth signals a sixth signal representative of the flow rate of said first feedstock portion to said first fractional distillation zone needed to achieve said maximum desirable vapor flow at said first point in said first fractional distillation zone up to a maximum value represented by said third signal, and manipulating the actual flow rate of said first feedstock portion responsive to said sixth signal.

2. A process in accordance with claim 1 wherein the improvement further comprises establishing a seventh signal representative of variations in the pressure of said multicomponent feedstock, and manipulating the actual flow rate of said second feedstock portion to said second fractional distillation zone responsive to said seventh signal.

3. A process in accordance with claim 1 wherein said fourth signal is established by establishing a seventh signal representative of the internal reflux at said first point in said first fractional distillation zone, establishing an eighth signal representative of the corresponding flow rate of said first bottoms product stream from said first fractional distillation zone, and adding said seventh signal, a signal representative of the flow rate of said first feedstock portion to said first fractional distillation zone, and the inverse of said eighth signal to obtain said fourth signal.

4. A process in accordance with claim 1 wherein said fourth and fifth signals are combined by establishing a seventh signal proportional to the ratio of internal reflux at said first point in said first fractional distillation zone to the flow rate of said first feedstock portion to said first fractional distillation zone, establishing an eighth signal proportional to the ratio of the flow rate of said first bottoms product stream from said first fractional distillation zone to the flow rate of said first feedstock portion to said first fractional distillation zone, establishing a ninth signal proportional to unity, adding said seventh and ninth signals and subtracting said eighth signal from the resulting sum, and dividing said resulting sum into said fifth signal to obtain a signal proportional to the flow rate of said first feedstock portion to said first fractional distillation zone needed to achieve said maximum desirable vapor flow at said first point in said first fractional distillation zone.

5. Apparatus comprising first and second fractional distillation columns, first conduit means connected to a common source of a multicomponent feedstock, second conduit means connected between said first conduit means and said first fractional distillation column to pass a first feedstock portion to said first fractional distillation column as the feed therefor, third conduit means connected between said first conduit means and said second fractional distillation column to pass a second feedstock portion to said second fractional distillation column as the feed therefor, first and second accumulators, fourth conduit means for withdrawing a first overhead vaporous stream from an upper portion of said first fractional distillation column, means for condensing at least a portion of the thus withdrawn first overhead vaporous stream and passing the thus at least partially condensed stream into said first accumulator, fifth conduit means connected between said first accumulator and an upper portion of said first fractional distillation column for passing at least a portion of the liquid from said first accumulator to said upper portion of said first fractional distillation column as reflux therefor, sixth conduit means for withdrawing a second overhead vaporous stream from an upper portion of said second fractional distillation column, means for condensing at least a portion of the thus withdrawn second overhead vaporous stream and passing the thus at least partially condensed stream into said second accumulator, seventh conduit means connected between said second accumulator and an upper portion of said second fractional distillation column for passing at least a portion of the liquid from said second accumulator to said upper portion of said second fractional distillation column as reflux therefor, eighth conduit means connected to a lower portion of said first fractional distillation column for withdrawing a first bottoms stream therefrom, and ninth conduit means connected to a lower portion of said second fractional distillation column for withdrawing a second bottoms stream therefrom, wherein the improvement comprises means for measuring the flow rate of the total feedstock through said first conduit means and establishing a first signal representative thereof, means for establishing a second signal representative of the minimum desirable flow rate of said second feedstock portion through said third conduit means to said second fractional distillation column, subtracting means, means for applying said first and second signals to respective inputs of said subtracting means to produce at an output thereof an electrical third signal representative of the maximum available flow rate of feedstock for said first fractional distillation column, means for establishing a fourth signal representative of the maximum desirable vapor flow rate at a first point in said first fractional distillation column, means for producing a fifth signal representative of the actual vapor flow rate at said first point in said first fractional distillation column, means for combining said fourth and fifth signals to obtain an electrical sixth signal representative of the flow rate of said first feedstock portion through said second conduit means needed to achieve said maximum desirable vapor flow rate at said first point in said fractional distillation column, an amplifier, means for applying said sixth signal to an input of said amplifier, first and second resistors connected in series between an output of said amplifier and said output of said subtracting means, a diode device connected between an input of said amplifier and the junction between said first and second resistors, and means for manipulating the rate of flow of said first feedstock portion through said second conduit means to said first fractional distillation column responsive to the ouptut signal from said amplifier.

6. Apparatus in accordance with claim 5 wherein said amplifier is a high gain operational amplifier, and wherein said means for producing a fifth signal comprises means for producing a seventh signal representative of the internal reflux at said first point in said first fractional distillation column, means for producing an eighth signal representative of the flow rate of said first bottoms product stream from said first fractional distillation column, means for adding said seventh signal and said output signal from said amplifier and subtracting said eighth signal from the resulting sum to produce said fifth signal.

7. Apparatus in accordance with claim 6 wherein said output signal from said amplifier is applied as one input to said means for producing a seventh signal and to said means for producing an eighth signal.

8. Apparatus in accordance with claim 5 wherein said means for producing a fifth signal comprises means for establishing a seventh signal representative of the ratio of the internal reflux at said first point in said first fractional distillation column to the flow rate of said first feedstock portion through said second conduit means to said first fractional distillation column, means for establishing an eighth signal representative of the ratio of the flow rate of said first bottoms product stream through said eighth conduit means to the flow rate of said first feedstock portion through said second conduit means, means for establishing a ninth signal representative of unity, means for adding said seventh and ninth signals and subtracting said eighth signal from the resulting sum to produce said fifth signal; and wherein said means for combining said fourth and fifth signals comprises means for dividing said fourth signal by said fifth signal.

9. Apparatus in accordance with claim 8 wherein said output signal from said amplifier is applied as one input to said means for producing a seventh signal and to said means for producing an eighth signal.

References Cited

UNITED STATES PATENTS

| | | | |
|---|---|---|---|
| 3,224,947 | 12/1965 | Lupfer | 202—160 |
| 3,230,154 | 1/1966 | Walker | 202—160 |
| 3,308,040 | 3/1967 | Johnson et al. | 203—1 |
| 3,309,287 | 3/1967 | Lupfer et al. | 203—1 |
| 3,322,938 | 5/1967 | Weiss | 235—151.12 |
| 3,332,856 | 7/1967 | Hart | 208—17 |

WILBUR L. BASCOMB, JR., *Primary Examiner.*

U.S. Cl. X.R.

62—21, 37; 196—132; 202—158, 160; 203—2, 71; 208—17; 235—151.12